(12) United States Patent
Lunn

(10) Patent No.: US 11,040,832 B2
(45) Date of Patent: Jun. 22, 2021

(54) MULTI-FUNCTIONAL CARRIER PUCK

(71) Applicant: The Unique Puck Company, Alvechurch (GB)

(72) Inventor: John Lunn, Henley in Arden (GB)

(*) Notice: Subject to any disclaimer, the term of this patent is extended or adjusted under 35 U.S.C. 154(b) by 0 days.

(21) Appl. No.: 16/861,325

(22) Filed: Apr. 29, 2020

(65) Prior Publication Data

US 2020/0346870 A1 Nov. 5, 2020

(30) Foreign Application Priority Data

Apr. 30, 2019 (GB) .................................. 1906087

(51) Int. Cl.
*B65G 17/32* (2006.01)
*B67C 3/24* (2006.01)

(52) U.S. Cl.
CPC .............. *B65G 17/32* (2013.01); *B67C 3/24* (2013.01); *B65G 2201/0261* (2013.01)

(58) Field of Classification Search
CPC .................................. B65G 17/32; B67C 3/24
USPC ............. 198/867.01, 867.08; 269/22, 254 R; 294/98.1
See application file for complete search history.

(56) References Cited

U.S. PATENT DOCUMENTS

| | | | |
|---|---|---|---|
| 2,534,527 A * | 12/1950 | Myers | B23B 31/1223 279/4.03 |
| 3,542,354 A * | 11/1970 | Fitzpatrick | B24B 41/067 269/22 |
| 4,807,421 A * | 2/1989 | Araki | A23L 3/04 198/803.11 |
| 5,244,082 A | 9/1993 | Togashi | |
| 5,484,052 A | 1/1996 | Pawloski et al. | |
| 5,897,090 A | 4/1999 | Smith et al. | |
| 6,015,154 A * | 1/2000 | Andre | B23B 31/305 279/2.07 |

(Continued)

FOREIGN PATENT DOCUMENTS

| EP | 0 600 130 | 6/1994 |
|---|---|---|
| EP | 3 594 134 | 1/2020 |

(Continued)

OTHER PUBLICATIONS

US 2010/0164187 A1, Geng, Jul. 1, 2010.*

(Continued)

*Primary Examiner* — Douglas A Hess
(74) *Attorney, Agent, or Firm* — Walters & Wasylyna LLC

(57) ABSTRACT

A carrier puck comprising a body having an interior chamber, into which a receptacle to be held by the carrier puck can be inserted, the carrier puck comprising a deformable element, disposed at least in part within the interior chamber; and the carrier puck comprising a pressurizing mechanism configured and arranged to facilitate fluid-filling and/or pressurization of a region within the interior chamber, and in dependence upon said pressurization, the deformable element is forced to move inwardly of the interior chamber and into contact with a receptacle for securing the receptacle within the interior chamber of the carrier puck. In this way the available space within the interior chamber for accommodating a receptacle can be reduced about the receptacle, thus securing the receptacle, accurately and quickly in its location within the carrier puck.

8 Claims, 8 Drawing Sheets

(56) References Cited

U.S. PATENT DOCUMENTS

| | | | | |
|---|---|---|---|---|
| 6,302,364 B1 * | 10/2001 | Chiueh | ................... | B60N 3/10 |
| | | | | 206/545 |
| 6,637,617 B2 * | 10/2003 | Eisenbraun | ............ | B60N 3/103 |
| | | | | 220/720 |
| 6,971,506 B2 * | 12/2005 | Hassinen | ............... | G01N 35/04 |
| | | | | 198/803.14 |
| 7,147,232 B2 * | 12/2006 | Andre, Sr. | ............ | B23B 31/305 |
| | | | | 279/2.05 |
| 7,708,136 B2 * | 5/2010 | Uriel | ...................... | B65B 43/52 |
| | | | | 198/803.11 |
| 8,851,438 B2 * | 10/2014 | Marshall | ................ | B23Q 3/062 |
| | | | | 248/346.2 |
| 9,085,057 B2 * | 7/2015 | Marshall | .................. | B25B 5/065 |

FOREIGN PATENT DOCUMENTS

| | | |
|---|---|---|
| GB | 2494377 B | 9/2015 |
| JP | H03-98826 | 4/1991 |

OTHER PUBLICATIONS

Intellectual Property Office, "Combined Search and Examination Report Under Sections 17 and 18(3)," App. No. GB1906087.0 (dated Oct. 28, 2019).

European Patent Office, Extended European Search Report, App. No. 20171802.0 (dated Oct. 9, 2020).

* cited by examiner

MULTI-FUNCTIONAL CARRIER PUCK

PRIORITY

This application claims priority from GB1906087.0 filed on Apr. 30, 2019, the entire contents of which are incorporated herein by reference.

FIELD

The present invention relates to a variable carrier puck, such as a device for receiving and supporting an article to be moved through a processing line. The present invention also relates to a variable carrier puck system, and more particularly, but not exclusively, to a carrier puck having an inflatable or otherwise expandable bladder. The invention finds advantageous application in high-speed automated bottling assemblies, for example bottling assemblies in the cosmetics and perfume industries where a very wide and varied inventory of containers, ranging in capacity, shape and dimension, are filled with product such as perfume, cosmetics, skincare products and the like.

BACKGROUND

It is known to use carrier pucks to receive and support an article, for instance a bottle or other container, as it is conveyed along a processing line, for example, an automatic or semi-automatic bottling line.

A conventional carrier puck may comprise a one-piece body with an aperture formed therein, the aperture being shaped and dimensioned to conform to the outer dimensions of a specific type of article which the carrier puck is designed to receive and support. For example, the aperture may have a circular cross section for receiving a cylindrical bottle.

Since the aperture of the conventional carrier puck is shaped and dimensioned for a specific type of article, for each different type of article a specifically designed carrier puck is required. Because known carrier pucks cannot be used for a different type, size, shape of container, it is usual for a very considerable number of carrier pucks to be made and stored at a bottling plant for use when the bottling line is configured for filling or processing a particular type of article.

Accordingly, storage requirements can be significant, which is costly and inconvenient. However, more problematic is the down-time associated with a change-over from one type of container to another. For example, in the perfume industry, it is very common for the same perfume to be bottled in a number of different types, size and shape of container; and, as the filling-line is changed-over from filling one type or container to another, all of the carrier pucks used for a first type of container must be removed; and a second set of carrier pucks loaded into the assembly line for accommodating a second-type of container. The first set of carrier pucks are then redundant, at least for a time, and need to be transported to storage in readiness for subsequent use with the first-type of containers. Furthermore, there can also be significant wastage when a new type of article (e.g., of a new shape and/or size) is introduced and replaces an existing type of container. For instance, if a new bottle with a square cross section replaces an existing cylindrical bottle, all of the carrier pucks used with the existing cylindrical bottles may become obsolete and will likely be discarded.

It is also usual for the aperture of a conventional carrier puck to be dimensioned for a loose fit of a container article which the carrier puck is designed to receive and support. This is so that the article can be placed and removed easily. For example, the conventional carrier puck might include a cylindrical aperture with an inner diameter of 152 mm to accommodate a cylindrical bottle with an external diameter of 150 mm. Consequently, the conventional carrier puck neither supports the article in a particularly stable manner nor locates it particularly precisely.

It is therefore desirable to produce an improved carrier puck which seeks to at least mitigate against or overcome drawbacks associated with known carrier pucks.

In GB2494377B to the present applicant, a new style of carrier puck for a container article of any one of a plurality of different sizes and/or shapes was provided. The carrier puck taught therein comprised: a support for supporting the article thereon; and a plurality of locating members for locating the article therebetween on the support. At least a first one of the locating members was movable for reducing a separation distance between it and another one of the locating members. This adaptable carrier puck operated well and addressed many of the drawbacks described above associated with standard carrier pucks. However, it is desirable to improve upon the adaptable carrier puck of GB '377 and it is desirable to develop a more simple solution, with fewer moving parts, that requires less set-up time and less maintenance. Furthermore, it is desirable if a carrier puck can ensure accurate location of and secure holding of a container article, as quickly as possible, and without damaging the article in anyway.

The present invention seeks to provide an improvement in the field of carrier pucks for containers or articles processed in a bottling line, that has particular advantageous application in the perfume and cosmetics industries. The invention may be utilized in applications other than perfume and cosmetics, for example it is foreseen that the invention may have application in holding container articles or primary packages used in healthcare, food and beverage, and personal care industries.

SUMMARY

Aspects of the invention provide a carrier puck system and a method as claimed in the appended claims.

According to one aspect of the invention, there is provided, a carrier puck comprising a body having an interior chamber into which a receptacle to be held by the carrier puck can be inserted, the carrier puck further comprising a deformable element disposed at least in part within the interior chamber; and a pressurizing mechanism for pressurizing a region of the interior chamber, where upon pressurization of said region of the interior chamber, the deformable element is forced to move inwardly of the interior chamber and into contact with a receptacle for securing the receptacle within the interior chamber of the carrier puck. In this way the available space within the interior chamber for accommodating a receptacle can be reduced about the receptacle, thus securing the receptacle, accurately and quickly in its location within the carrier puck.

Optionally, the deformable element is provided by a flange having a wall, the flange being held within the carrier puck and being deformable by pressurizing a region of the interior chamber that is radially outward of the wall, such that the wall is deformable radially inwardly to such an extent that the wall comes into contact with a receptacle when disposed in the interior chamber such that the available space within the interior chamber for accommodating a receptacle is reduced and taken up by the deformable wall which is then closed-in around and in contact with the receptacle, thus securing the receptacle in place.

Optionally the flange is a molded elastomeric construct. Optionally the flange is formed of rubber. Optionally the flange comprises an upper annular lip and a lower annular lip, disposed above and below said wall, respectively. The upper and lower annular lips each having a radius greater than the radius of the wall such that the upper and lower annular lips extend radially outwardly beyond the wall. The carrier puck body may comprise an upper annular channel and a lower annular channel for seating the upper and lower annular lips, respectively. The wall of the deformable flange may comprise alternating sections of different thickness. The upper and lower annular lips may be secured tightly in place by top and bottom plates screw-fixed to the body of the carrier puck.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described, by way of example only, with reference to the accompanying drawings, in which.

DETAILED DESCRIPTION

Detailed descriptions of specific embodiments of the carrier pucks, carrier puck systems and methods of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the carrier pucks, carrier puck systems and methods described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
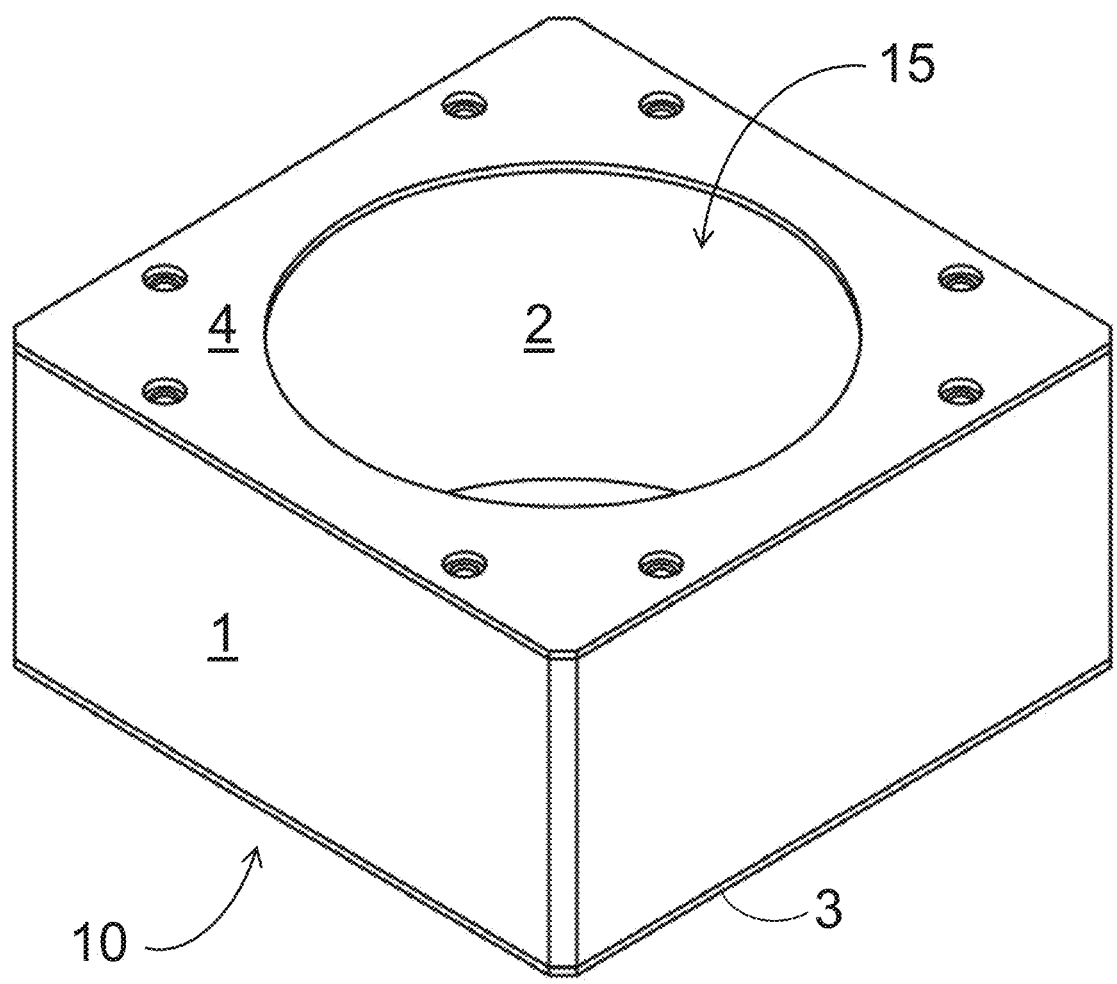
FIG. 1 is a perspective view from the top of a carrier puck according to an embodiment of the invention.
Figure 5:
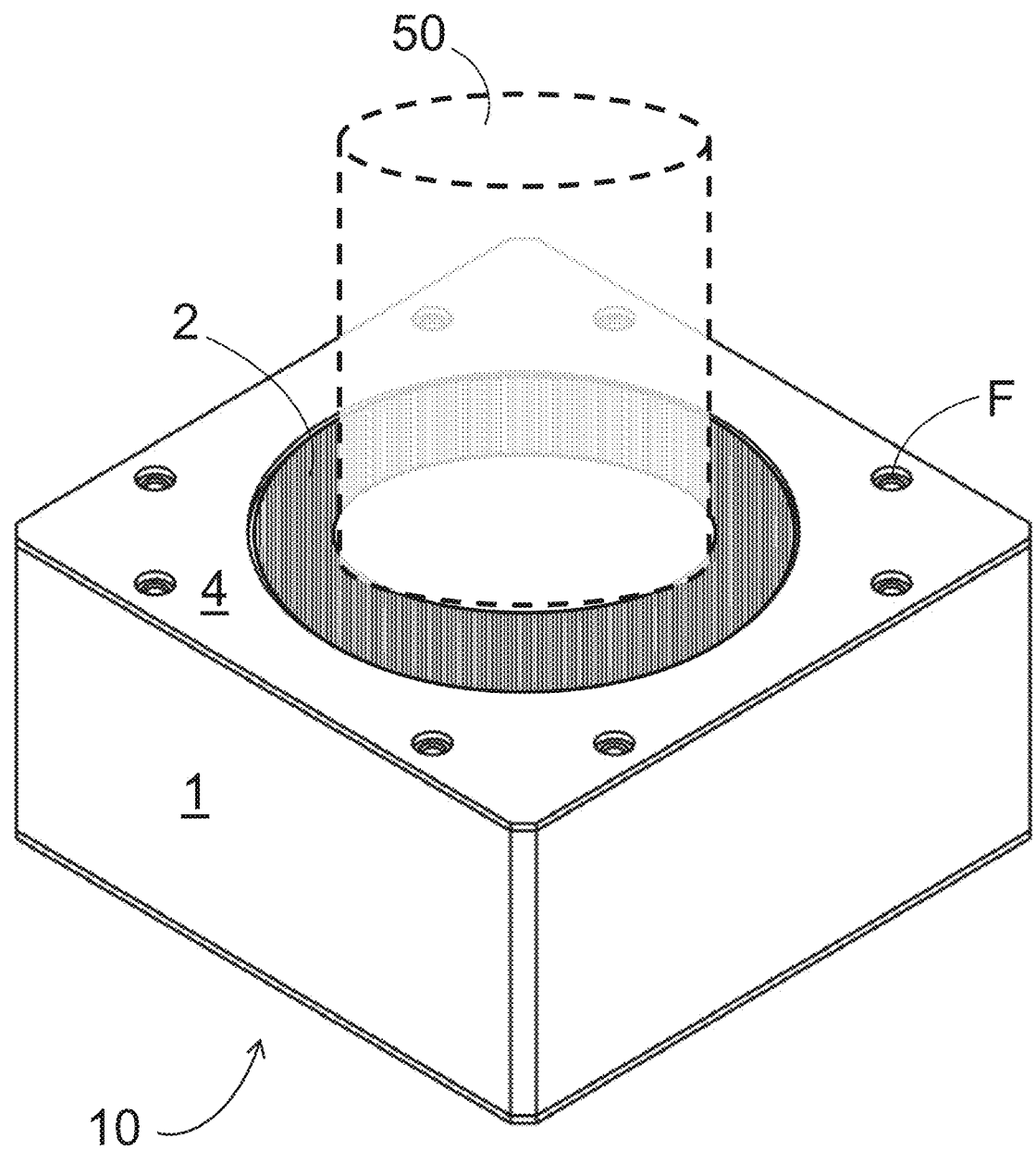
FIGS. 5 and 6 are perspective views showing the carrier puck of FIG. 1 loaded and inflated and securely and precisely holding: a first-type of container (a cylindrical-shaped container of a first capacity); and a second-type of container (a cuboid-shaped container of a second volume), respectively.
Figure 6:
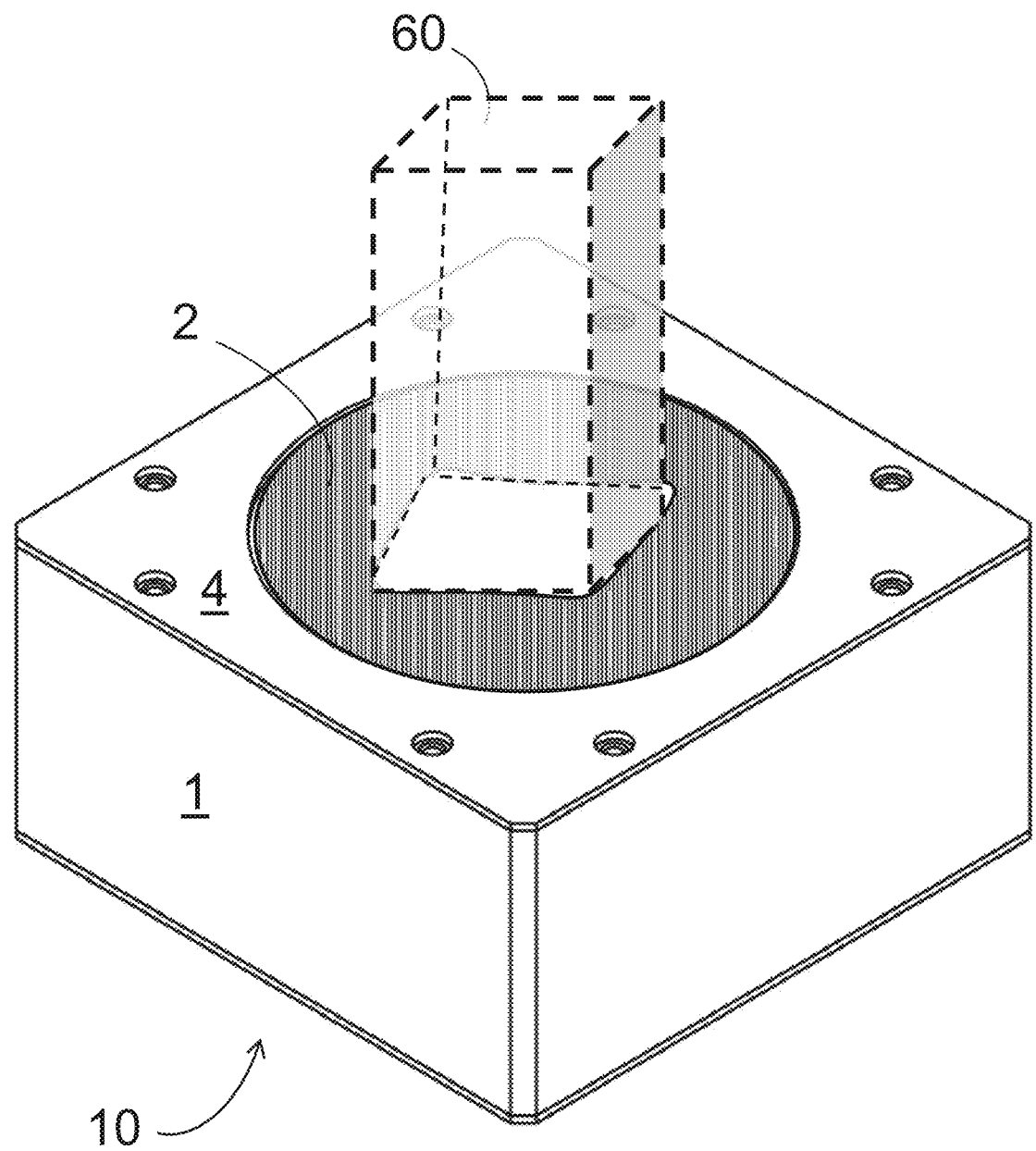

Referring to FIG. 1, there is shown a carrier puck 10. The carrier puck 10 is configured such that the same carrier puck 10 can be used to carry a selection of articles 50, 60 (see FIGS. 5 and 6), containers and primary packages of numerous and various size, shape, style, material and capacity.

In the embodiments detailed herein, the terms "carrier puck", "puck" and "carrier" refer, for the non-limiting purpose of illustrating the various devices and apparatus for use in a variety of automated and/or semi-automated filling and bottling assembly lines.

In the embodiments detailed herein, the terms "article", "container", "bottle" and "primary package" refer, for the non-limiting purpose of illustrating the various features of the invention, to a receptacle, vessel or product container 50, 60, for holding, carrying and/or dispensing a product, such as, but not limited to, a liquid, a perfume, a cosmetic product in the form of, for example, a powder, liquid, paste, cream and/or mousse), a beverage, and a food-item (such as a sauce). It is contemplated that the teachings of the invention can be applied to various product containers 50, 60, which may or may not be of uniform diameter, uniform cross-sectional shape, tapered, rectangular and/or cylindrical. Exemplary product containers 50, 60 include bottles (for example metallic, glass or plastics bottles), and the like.

The carrier puck 10 shown in FIG. 1 may be considered as having a standard-outer structure, i.e. an outer size, shape and dimension (configuration or form) that is suitable for implementation in known bottling or filling processing assemblies. It is to be understood that the term "carrier puck" includes all manner of shapes and sizes of carrier puck and is not limited to the generally cuboid form illustrated in the Figures. It should be recognized that one or other numbers of flanges (see below) may be incorporated, where suitable, into a single carrier puck, for example, to provide a carrier puck that can accommodate more than one receptacle. Whereas it may be preferable for a single carrier puck 10, having a single flange to securely and temporarily house a single receptacle, it should be recognized that other numbers of receptacle may be held by a single flange in a single carrier puck, where suitable.

In the illustrated embodiment, the carrier puck 10 is configured, sized an arranged to hold a single receptacle, from a range of receptacle sizes from a minimum diameter up to a maximum diameter. As an example, the size-range that may be accommodated by the carrier puck 10 may be from a minimum diameter of, for example, 30 mm up to a maximum diameter of, for example, 100 mm. The carrier puck 10 is a multi-functional carrier puck 10 because the same puck 10 can be used for securely holding a range of sizes and shapes of article. The carrier puck 10 is able to function as a carrier puck for a small bottle, as well as for a larger bottle, as well as for an even larger bottle still, because it has an adjustable interior chamber. The size of the interior chamber is adjusted by pressuring the puck 10.

Figure 2:
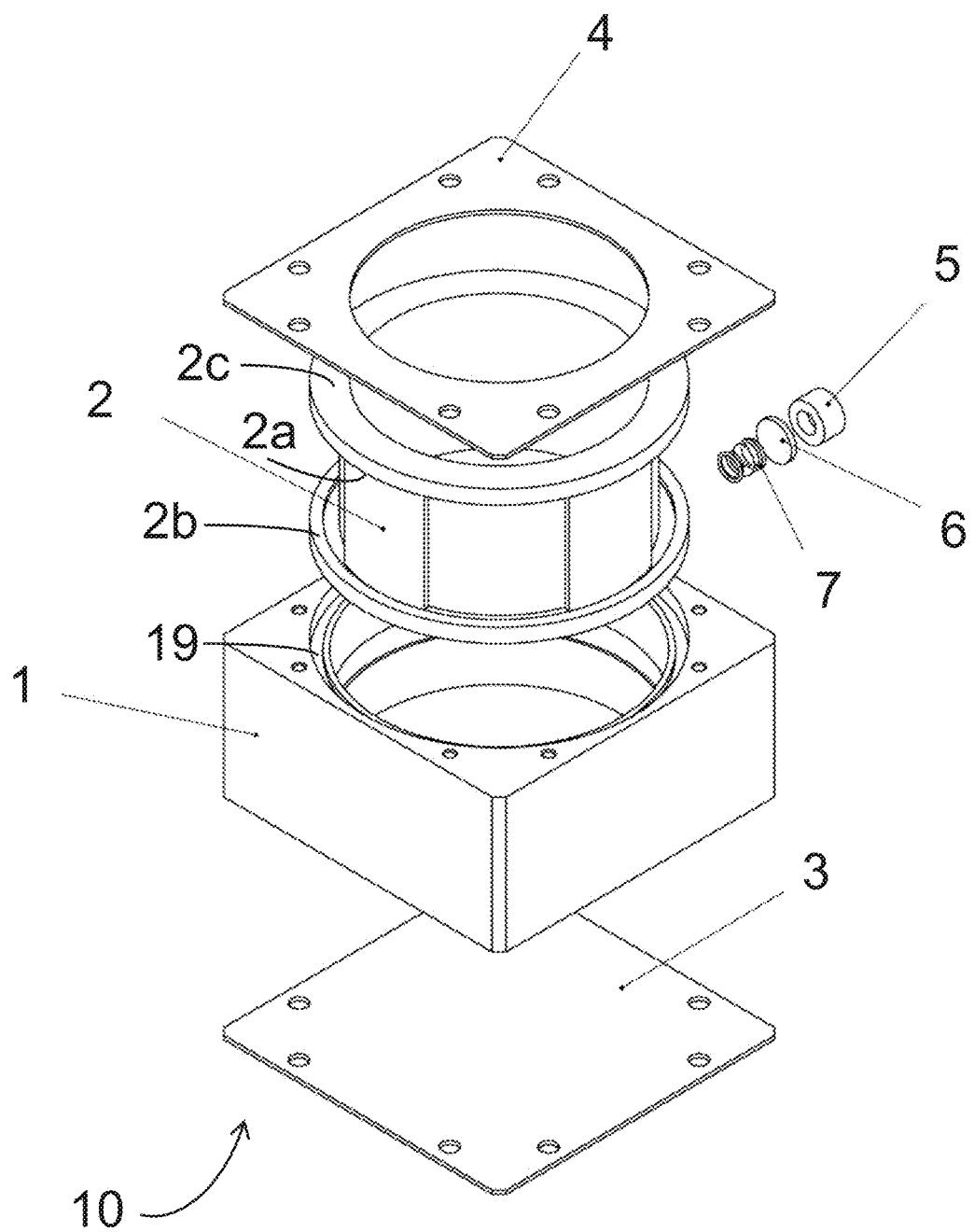
FIG. 2 is an exploded perspective view of the carrier puck of FIG. 1.
Figure 3:
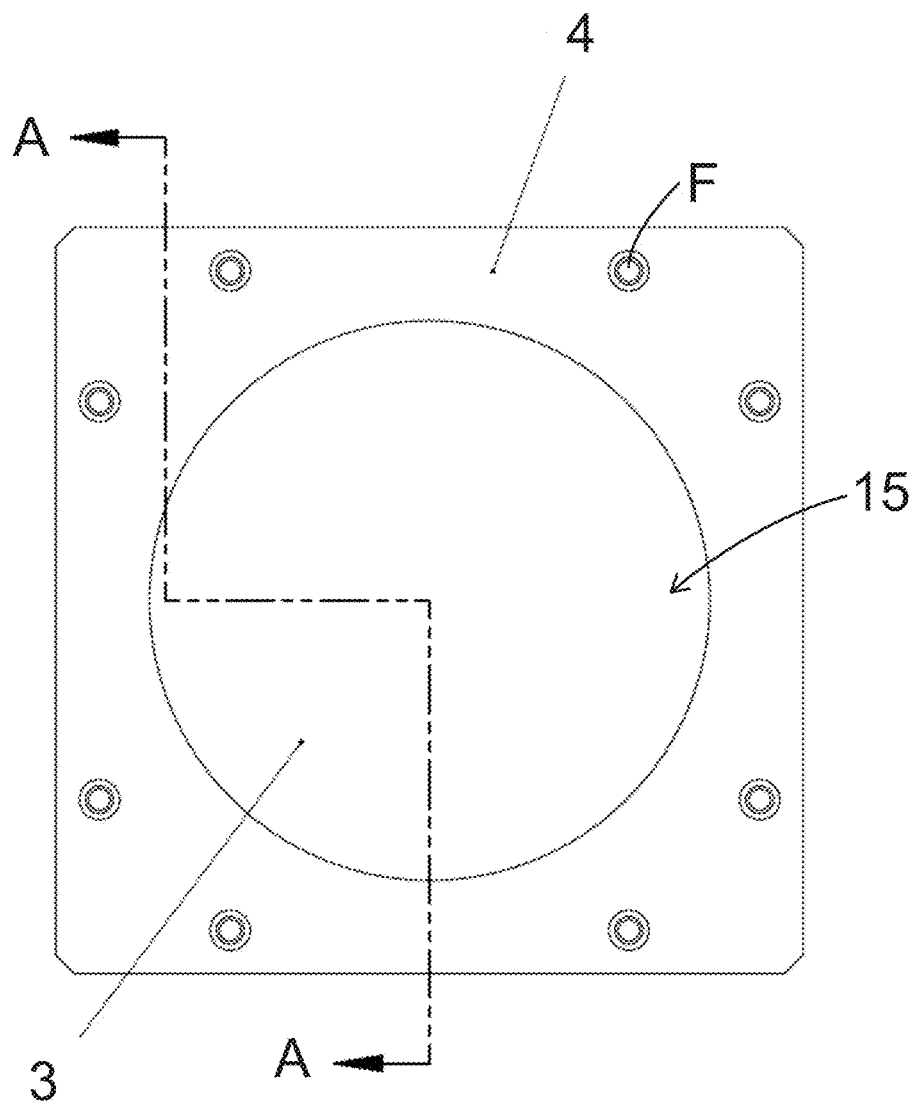
FIG. 3 is a top-plan view of the carrier puck of FIG. 1, illustrating a line A-A.

Referring to FIGS. 1 and 2 the carrier puck 10 comprises a body 1, a top plate 4, a bottom plate 3, a bladder or flange 2, and an interior chamber 15.

The body 1 may be made of nylon and may be substantially solid in construction with an aperture or bore, optionally of circular cross-sectional shape for defining the interior chamber 15. The interior chamber 15 is optionally formed such that it provides an upper annular channel 19 and a lower annular channel 21—see FIG. 2.

The top plate 4 and bottom plate 3 may each be formed of stainless steel and may each be smooth planar, flat plates. Optionally, the top plate 4 comprises an aperture, which may be circular and shaped similarly to the cross-sectional shape of the interior chamber 15. The top plate 4 and its aperture are sized such that the upper annular channel 19 is covered over or closed by the top plate 4. The bottom plate 3 may be a solid construction (no aperture and accordingly, the lower annular channel 21 is covered over or closed by the bottom plate 3. Optionally, both the top plate 4 and bottom plate 3 are provided with fixing means for enabling a secure fixing of the top and bottom plates 4, 3 to the body 1. In the present arrangement, apertures are provided for receiving fixing elements therethrough for screw-fix attachment of the top and bottom plates 4, 3 to the body 1.

The flange 2 may also be referred to as a molded portion or diaphragm, and may be formed from rubber (synthetic or natural) or other suitable elastomeric material. As best seen in FIG. 2, the diaphragm 2 is sized to be fit within the interior chamber 15 and has an upper lip 2c and a lower lip 2b which fit, locate or can be seated onto the upper and lower annular channels 19, 21 respectively. As can be seen the flange 2 has a main circular body member 2a, which may comprise alternating sections of different thicknesses. The upper and lower annular lips 2c, 2b are of similar diameter to each other and are each of greater diameter than the main circular body member 2a.

Figure 4:
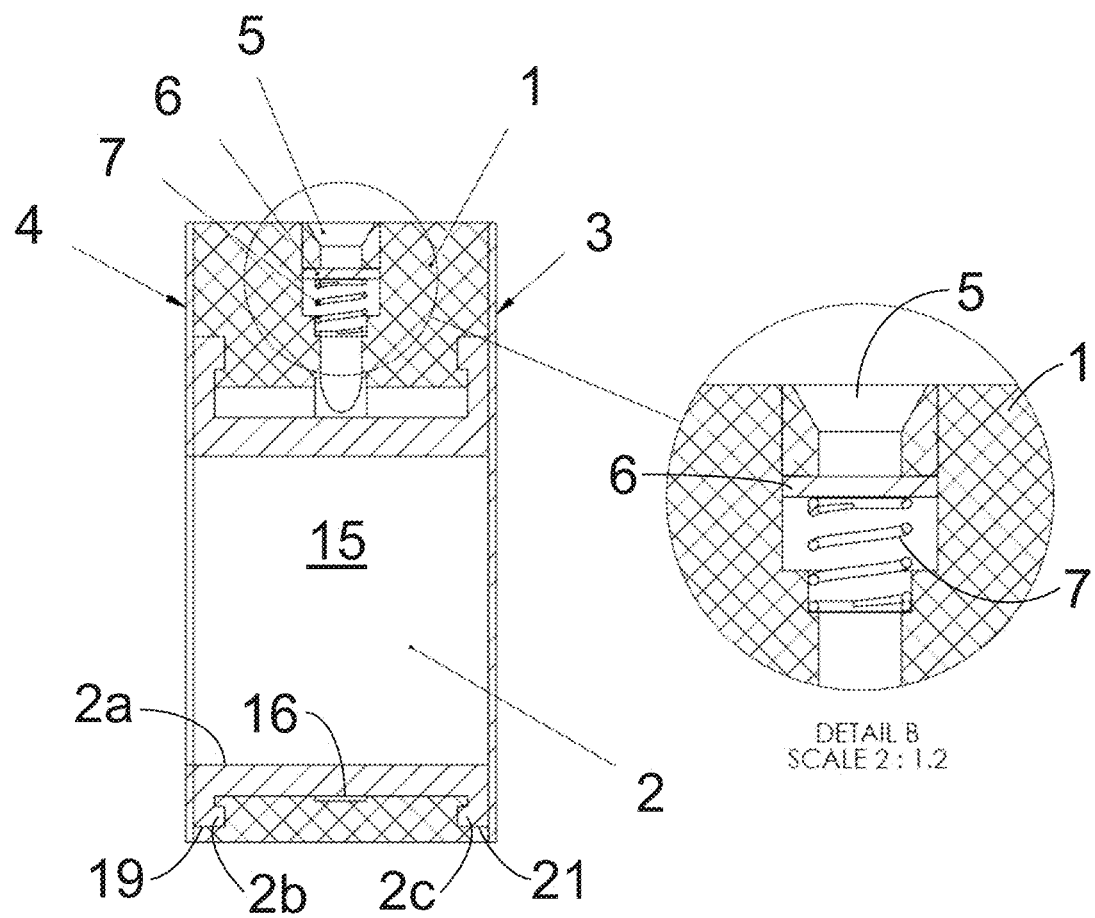
FIG. 4 is a view of a cross-section taken along the line A-A shown in FIG. 3.

An inflating or pressurizing mechanism 5/6/7 is shown in FIGS. 2 and 4. The inflating or pressurizing mechanism 5/6/7 comprises an aluminum air entry valve 5 seated in an opening in the body 1; a rubber diaphragm 6 disposed over the valve 5 and a spring steel, spring element 7. The size, diameter, construct and configuration of the pressurizing mechanism 5/6/7 may differ from that shown, provided that a suitable mechanism is incorporated, by means of which, a portion 16 of the interior chamber 15 can be pressurized so that the main circular body member 2a of the flange 2 can be manipulated, stretched and displaced from its "at-rest" condition (see FIGS. 2, 4 and 7) into its "pressurized" condition (see FIGS. 5, 6 and 8) wherein, the main circular body member 2a is moved or distorted radially inwardly.

The flange 2 is fitted within the body 1 by sequential seating of: the lower lip 2c into the lower annular channel 21; the main circular body member 2a into the interior channel 15; and the lower lip 2b into the upper annular channel 19. Then the body 1 and flange 2 are sandwiched between the top and bottom plates 4, 3, respectively. The screw-fix attachment of the top and bottom plates 4, 3 to the body 1 enables a tight fit to be achieved. In this way once the flange 2 is installed within the interior chamber 15, and the upper and lower lips 2b, 2c seated in the upper and lower annular channels 19, 21, a closed and hermetically sealed portion 16 of the interior chamber 15 is formed.

The sealed portion 16 can be pressurized using the inflating or pressurizing mechanism 5/6/7.

The flange 2 is sufficiently malleable and elastic, for example, by pressurization of the sealed portion 16 of the interior chamber 15 with air or other gas, that it can be distorted and deformed.

The extent to which the flange 2 can move upwardly or downwardly, is restricted by the rigid body 1, top plate 4 and bottom plate 3 that surround the flange 2.

The extent to which the flange 2 can move radially outward is restricted by the rigid body 1, top plate 4 and bottom plate 3 that surround the flange 2 and the condition of the closed and hermetically sealed portion 16 of the interior chamber 15.

As the closed and hermetically sealed portion 16 of the interior chamber 15 is pressurized by the insertion of fluid such as gas, optionally, air, the flange 2 is restricted in every other direction such that it only has the freedom to flex radially inwardly toward the center of the interior chamber 15.

The extent to which the flange 2 has freedom to flex radially inwardly depends upon the material from which the flange 2 is formed; the pressure in the closed and hermetically sealed portion 16 of the interior chamber 15, temperature, and the size of the interior chamber 15, as well as the presence and size of any vessel or receptacle 50, 60 disposed within the interior chamber.

Because the body 1 has a relatively solid construction, the body 1 is rigid and sufficiently strong to withstand pressure when air or other suitable gas or fluid is inserted into the closed and hermetically sealed portion 16 of the interior chamber 15. In this way pressurization of the chamber portion 16 causes at least main circular body member 2a of the flange the flange 2 to adopt a securing position about an article 50, 60 (see FIGS. 5, 6 and 8).

It will therefore be understood that the exact shape and size of the receptacle 50, 60 to be held by the carrier puck 10 are not factors that affect the puck's 10 ability to hold the receptacle 50, 60, provided that the receptacle 50, 60 has a minimum diameter that is equal to or greater than the puck minimum diameter and a maximum diameter that is greater than or equal to the puck maximum diameter.

Figure 7:
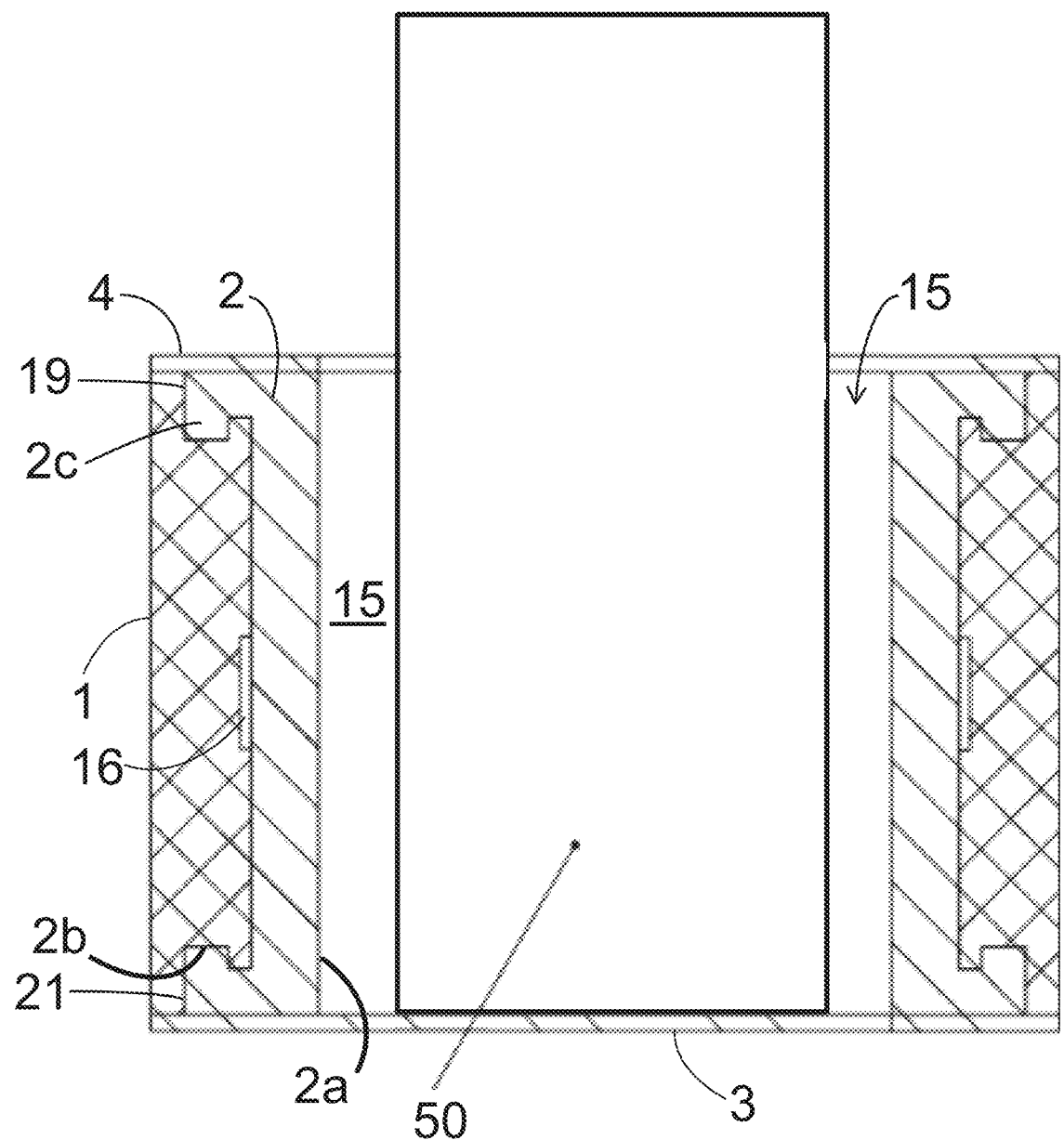
FIG. 7 is a cross-sectional view of the puck in an un-inflated (un-pressurized, at-rest) state, with an article disposed therein.
Figure 8:
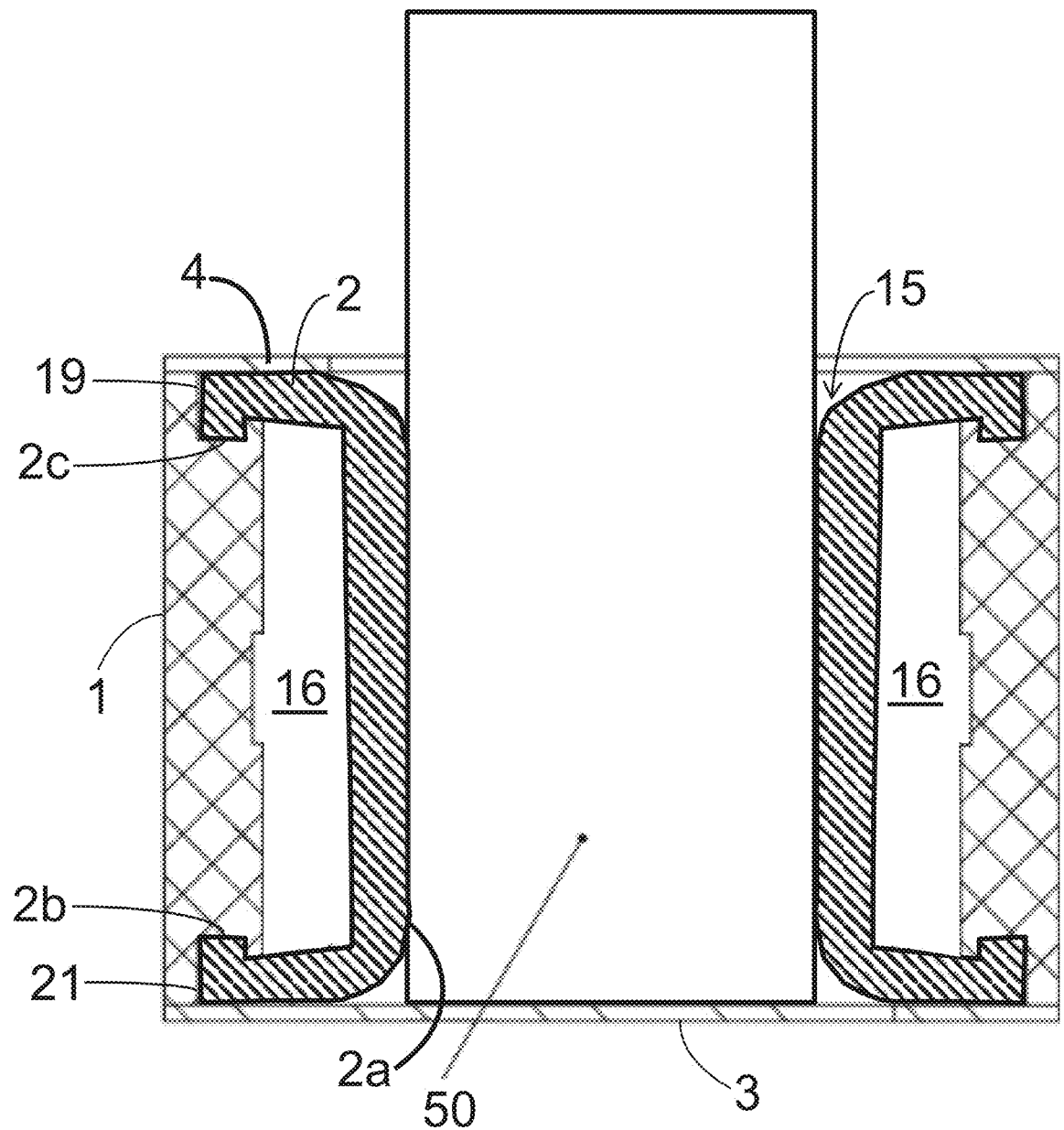
FIG. 8 is a cross-sectional view of the puck in an inflated and pressurized) state, wherein gas has been pumped into the puck and has forced the flange into an engaging and securing position such that the article, surrounded by the flange, is securely held therein.

In FIG. 7, there is shown a receptacle 50 disposed within the interior chamber 15. The closed and hermetically sealed portion 16 of the interior chamber 15 can be seen. Using the inflating or pressurizing mechanism 5/6/7 the annular chamber portion 16 can be filled with gas, which pushes the flange 2 radially inward toward the receptacle 50. This may increase the size of the chamber portion 16; and decrease the capacity of the interior chamber portion 15, bringing the flange 2 into circumferential contact with the receptacle 50, thus securing it in place. The flexibility of the flange enables most shapes of vessel 50 to be accommodated by the carrier puck 10.

The carrier puck 10 can securely hold an article 50 of almost any shape, provided that the article 50 does not have a maximum diameter greater than the puck maximum diameter that can be accommodated by the carrier puck 10. The maximum diameter that can be accommodated by the carrier puck 10 is, at least to some extent, determined by the size of the core or interior chamber 15 within the body 1, and the diameter of the flange 2. It will be understood that pucks 10 according to the invention may be made in a few different sizes, albeit, it is beneficial and advantageous if the pucks of a set have a large enough diameter such that the set of pucks is capable of accommodating a range of articles, up to and including the largest article used on a particular bottling line. Therefore, no change over of the pucks is required, even when the bottling line is changed over from filling one size, say a 15 ml bottle to another size, say a 30 ml bottle. However, in some scenarios, it may be beneficial if a bottling line is equipped with more than one set of pucks; with each set having a different (and optionally overlapping) range of bottle sizes that the pucks can accommodate. For example, a first set of pucks may be able to accommodate any size of bottle from 15 ml to 50 ml and diameters of 3 cm to 10 cm and a second set of pucks may be able to accommodate any size of bottle from 40 ml to 100 ml and diameters of 8 cm to 15 cm.

To release the pressure within the fluid filled chamber 16, the valve within the inflating or pressurizing mechanism 5/6/7 is opened and the gas within the chamber portion 16 is released. Optionally, this may be achieved by using a needle inserted into the valve 5, which pushes against the diaphragm 6 and spring 7 allowing air to be expelled from the interior chamber 15. The flange 2 relaxes back into its at-rest condition and moves away from the receptacle, thus releasing its "grip" on the receptacle 50, 60. Beneficially, because of the material characteristics of the deformable flange 2, the receptacle 50, 60 can be very securely and tightly "gripped" without risk of damage to the receptacle.

Further beneficially, due to the provision of the valve controlled pressurizing mechanism 5/6/7 on the carrier puck 10, once the carrier puck 10 has been pressurized, the closed valve maintains the pressurized state and the carrier puck 10 can travel about a bottling line unfettered and free of any connection to an air-tube.

Also of considerable benefit is that the tight-grip that the flange 2 has on the receptable 50, 60 is sufficient to prevent the receptacle from rotating or swiveling during capping. Many current bottling lines require additional apparatus to ensure that the receptacle cannot turn during capping, and further disadvantageously, some such apparatus can occasionally cause damage to the outer lacquer layers provided on the receptacles.

It can be appreciated that various changes may be made within the scope of the present invention, for example, in other embodiments of the invention it is envisaged that the flange may be replaced by a bladder or tire type structure, which may be inflated and pressurized in order to fill the empty space between the vessel 50, 60 and the flange/bladder that exists in an "at-rest" condition such that the vessel 50, 60 can be securely held by the carrier puck.

It is envisaged that the carrier puck may be configured to hold more than one vessel, optionally by the provision of a double or multiple-chambered puck and/or by the provision of a double or multiple-holed flange.

It is envisaged that the size and shape of the interior and exterior of the body may be adjusted to accommodate articles of differing size and shape.

It will be recognized that as used herein, directional references such as "top", "bottom", "base", "front", "back", "end", "side", "inner", "outer", "upper" and "lower" do not necessarily limit the respective features to such orientation, but may merely serve to distinguish these features from one another.

What is claimed is:

1. A carrier puck comprising a body having an interior chamber into which a receptacle to be held by the carrier puck can be inserted, the carrier puck further comprising a deformable element disposed at least in part within the interior chamber; and a pressurizing mechanism for pressurizing a region of the interior chamber, where upon pressurization of said region of the interior chamber, the deformable element is forced to move inwardly of the interior chamber and into contact with a receptacle for securing the receptacle within the interior chamber of the carrier puck, wherein, the deformable element is provided by a flange having a wall, the flange being held within the carrier puck and being deformable by pressurizing a region of the interior chamber that is radially outward of the wall, such that the wall is deformable radially inwardly to such an extent that the wall comes into contact with a receptacle when disposed in the interior chamber, wherein, the flange comprises an upper annular lip and a lower annular lip, disposed above and below said wall respectively, the upper and lower annular lips each having a radius greater than the radius of the wall such that the upper and lower annular lips extend radially outwardly beyond the wall.

2. A carrier puck according to claim 1 wherein, the flange is a molded elastomeric construct.

3. A carrier puck according to claim 2 wherein, the flange is formed of rubber.

4. A carrier puck according to claim 2 wherein, the flange is formed of polyurethane.

5. A carrier puck according to claim 1 wherein, the carrier puck body comprises an upper annular channel and a lower annular channel for seating the upper and lower annular lips, respectively.

6. A carrier puck according to claim 5 wherein, the wall of the deformable flange comprises alternating sections of different thickness.

7. A carrier puck according to claim 6 wherein, the upper and lower annular lips may be secured tightly in place by top and bottom plates screw-fixed to the body of the carrier puck.

8. A carrier puck according to claim 1, wherein the pressurizing mechanism comprises a valve which allows air-flow into and air-flow out of the carrier puck in dependence upon whether the carrier puck is being pressurized or de-pressurized.

* * * * *